(12) United States Patent
Cunningham et al.

(10) Patent No.: US 8,558,850 B2
(45) Date of Patent: Oct. 15, 2013

(54) COORDINATE SYSTEM RECOVERY TOOL AND METHOD

(75) Inventors: Patrick Cunningham, Hallowell, ME (US); Victor Minor, Benton, ME (US); James Dunn, Falmouth, ME (US); Samuel Knight, Woolwich, ME (US); Edward Florence, Toronto (CA)

(73) Assignee: Blue Marble Group, Inc., Gardiner, ME (US)

( * ) Notice: Subject to any disclaimer, the term of this patent is extended or adjusted under 35 U.S.C. 154(b) by 943 days.

(21) Appl. No.: 12/244,065

(22) Filed: Oct. 2, 2008

(65) Prior Publication Data
US 2010/0085381 A1  Apr. 8, 2010

(51) Int. Cl.
*G09G 5/00* (2006.01)
(52) U.S. Cl.
USPC .......................................... 345/645; 345/630
(58) Field of Classification Search
None
See application file for complete search history.

(56) References Cited

U.S. PATENT DOCUMENTS

| 5,806,061 | A * | 9/1998 | Chaudhuri et al. ................... 1/1 |
| 6,041,140 | A * | 3/2000 | Binns et al. ................... 382/209 |
| 6,240,423 | B1 * | 5/2001 | Hirata ................................... 1/1 |
| 7,639,253 | B2 * | 12/2009 | Bae et al. ...................... 345/427 |
| 2005/0285876 | A1 * | 12/2005 | Balaga et al. ................. 345/629 |

* cited by examiner

*Primary Examiner* — Joni Richer
*Assistant Examiner* — Michelle Chin
(74) *Attorney, Agent, or Firm* — Preti Flaherty Beliveau & Pachios LLP

(57) ABSTRACT

A method of recovering coordinate system information for a geographic data file for which coordinate system information is unavailable. The method includes obtaining a raster image corresponding to the geographic data file, and correlating the raster image to the earth's surface. A list of probable coordinate systems for the raster image is generated, and a statistical analysis is performed for each likely coordinate system candidate. The suggested coordinate systems are then ranked using statistical analysis.

16 Claims, 3 Drawing Sheets

| PIXEL | PIXEL LOCATION (X,Y,Z) | REFERENCE POINT (LATITUDE; LONGITUDE) |
|---|---|---|
| NW | 0, 0, 0 | 43.628570000000003; -85.567300000000003 |
| SW | 7699, 0, 0 | 43.559249999999999; -85.567809999999994 |
| NE | 0, 5861, 0 | 43.628270000000001; -85.494649999999993 |
| SE | 7699, 5861, 0 | 43.558950000000003; -85.495249999999999 |

COORDINATE SYSTEM RECOVERY TOOL AND METHOD

BACKGROUND OF THE INVENTION

This invention relates generally to recovering coordinate system information for geographic data files for which such information is lost or otherwise unavailable.

A geographic information system (GIS) generally refers to a digital representation of geographically referenced information structured to support spatial analysis. While having many purposes, GIS data files have been found to be particularly useful in electronic map production. GIS data are formatted into a set of parameters that define how the data are displayed or interpreted as a map. These parameters, which typically include projection (including various subfactors, such as parallels (meridians), spheroid and zones, depending on the projection), position on screen, scale, units and angle of rotation, are collectively referred to as a "coordinate system." A coordinate system can contain all or part of this set of parameters.

A projection is a vital part of displaying geographic data. "Projection" is a cartographic term for a mechanism (typically a mathematical algorithm) of portraying the spherical surface of the earth, or a portion thereof, on a flat surface. In displaying the earth on a flat surface some distortions of conformality, distance, direction, scale and area always result from the process; no projection is perfect. Different projections allow mapmakers to balance these various distortions, favoring one truth over another as best suited for a particular application. Every projection has advantages and disadvantages; for instance, some are better for depicting small areas while others are better for depicting large areas. There are hundreds of different projections in use today, each with its own unique formula and set of distortions.

Modern maps are commonly produced using geographic or GIS data files that have been obtained from photographs, particularly aerial and satellite imagery. Generally, a photograph is scanned to produce a digital raster image. In a process called orthorectification, errors introduced by the photographic methodology and the three dimensional nature of real world terrain are removed from raw image data. The raster image is georeferenced by applying coordinate projection information and tying the image to the earth's surface. This coordinate system and ground tie point information, termed metadata, is represented in data files that, in many cases, are distinct or separate from the image file but can also be contained within the file itself (ex. geotiff). Such metadata can easily become damaged, corrupted, separated or lost from the data file, or otherwise unusable. Many GIS projects use raster imagery that once was properly georeferenced, but lacks sufficient accompanying metadata to tell the GIS user what the correct coordinate system is. This information is critically important for creating accurate maps from raster imagery.

SUMMARY OF THE INVENTION

The present invention provides, in one aspect, a method of recovering coordinate system information for a geographic data file for which coordinate system information is unavailable. The method includes obtaining a raster image corresponding to the geographic data file, and correlating the raster image to the earth's surface. A list of probable coordinate systems for the raster image is generated, and a statistical analysis is performed for each likely coordinate system candidate. The suggested coordinate systems are then ranked using statistical and probability analyses.

In another aspect, the present invention provides a computer-readable medium containing instructions for controlling a computer system to perform the method of recovering coordinate system information for a geographic data file for which coordinate system information is unavailable.

DETAILED DESCRIPTION OF THE INVENTION

The present invention relates to a software tool, and related methodology, for recovering or identifying the coordinate system or projection of a geographic data file where the coordinate system or projection is unknown or not identifiable. By recovering the coordinate system information, the present invention enables the geographic data file to be used for accurate map production. In one embodiment, the software tool includes a software program that enables a user to process a geographic data file that has been previously orthorectified but for which the coordinate system data is lost or otherwise unavailable, by estimating and assigning the lost information to the data file.

Figure 1:
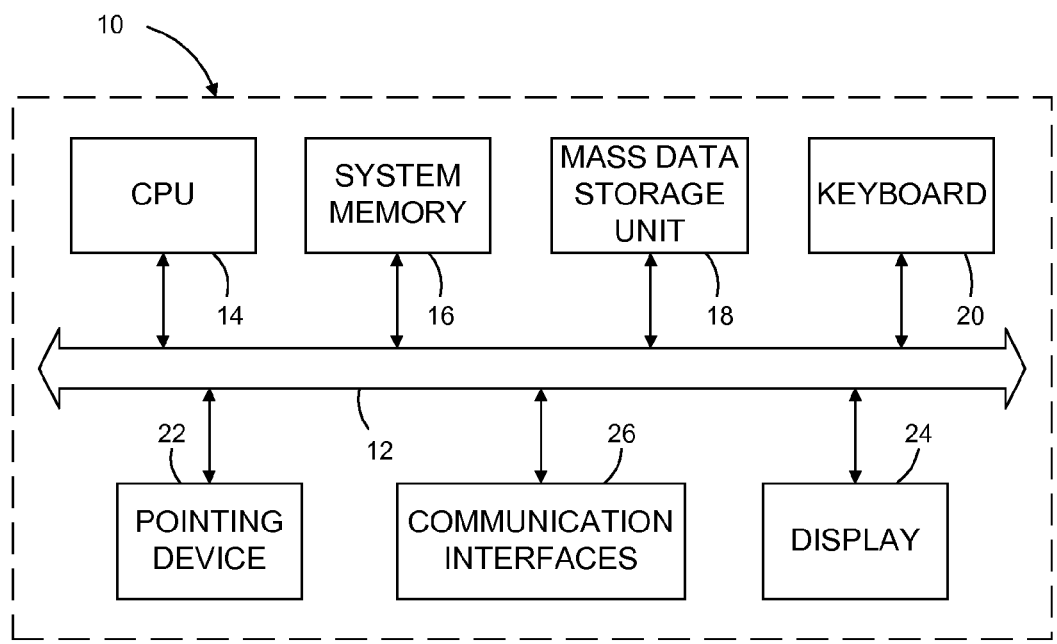
FIG. 1 is a block diagram depicting one embodiment of a computer system for implementing a software tool.

Referring now to the drawings wherein identical reference numerals denote the same elements throughout the various views, FIG. 1 depicts one possible embodiment of a computer system 10 that can be used to implement the software tool. In general, the computer system 10 includes a system bus 12 for communicating information and a central processing unit (CPU) 14 for processing information and instructions. The CPU 14 is coupled with the bus 12 and may comprise one or more microprocessors or any other type of processor. The computer system 10 also includes a system memory 16 and a mass data storage unit 18 coupled with the bus 12. The system memory 16 generally includes computer readable media for storing information and instructions for the CPU 14. This can be in the form of volatile memory such as random access memory (RAM) and/or non-volatile memory such as read only memory (ROM). The mass data storage unit 18 may include one or more types of removable and/or non-removable computer readable media. These include, but are not limited to, a hard disk, a floppy disk, an optical disk such as a CD-ROM, CD-R, CD-RW, DVD-ROM, DVD-RAM or other optical media, and flash memory.

A keyboard 20 and a pointing device 22 are coupled to the bus 12 to permit a user to input information into the computer system 10. The pointing device 22 can comprise any one of a number of well known devices such as a mouse, a track-ball, a track pad, an optical tracking device, a touch screen, etc. A display 24 for displaying information to the user is also coupled to the bus 12. The computer system 10 also includes one or more communication interfaces 26 coupled with the bus 12 for enabling the system 10 to connect with other electronic devices. The communication interfaces 26 can include any of a number of well known communication standards and protocols, such as serial communication port, Universal Serial Bus (USB), Ethernet, FireWire (IEEE 1394), parallel, small computer system interface (SCSI), infrared (IR) communication, Bluetooth wireless communication, etc.

In one possible implementation, the software tool resides within one or more computer readable media of the computer system 10. The software tool can be loaded into the computer system 10 via a removable computer readable medium (such as a floppy disk, CD-ROM or the like) inserted into the appropriate drive of the computer system 10 and accessed from there. Alternatively, the software tool could be accessed from the removable computer readable medium inserted into the appropriate drive. In another possible implementation, the software tool could reside on a remote computer readable medium and be accessed by the computer system 10 via the Internet or other computer network. As used herein, the term "computer readable medium" refers generally to any medium (including both volatile and non-volatile media, as well as removable and non-removable media) from which stored data can be read by a computer or similar device. Computer readable media include, but are not limited to, hard disks, floppy disks, magnetic cassettes, flash memory cards, flash drives, optical media such as a CD-ROM, CD-R, CD-RW, DVD-ROM, DVD-RAM and the like, random access memories (RAMs), read only memories (ROMs), and other integrated circuit memory devices. While one exemplary computer system has been described for purposes of illustration, it should be noted that the present invention is not limited to implementation on this particular system. One skilled in the art will recognize that many other systems are possible.

Figure 2:
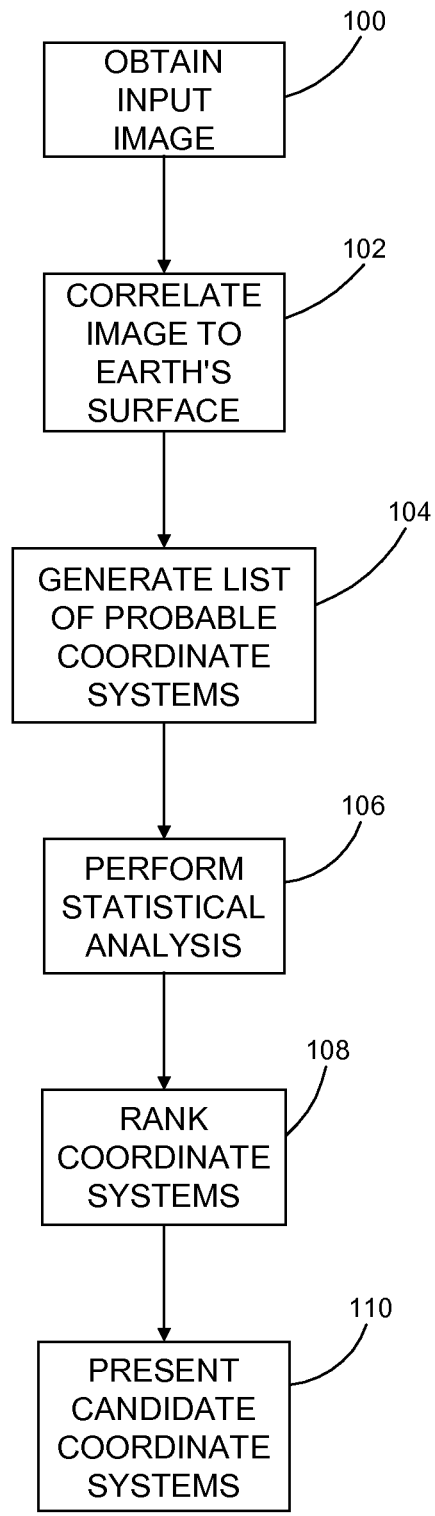
FIG. 2 shows a flow chart depicting one embodiment of a method for recovering coordinate system information.
Figures 3, 4:
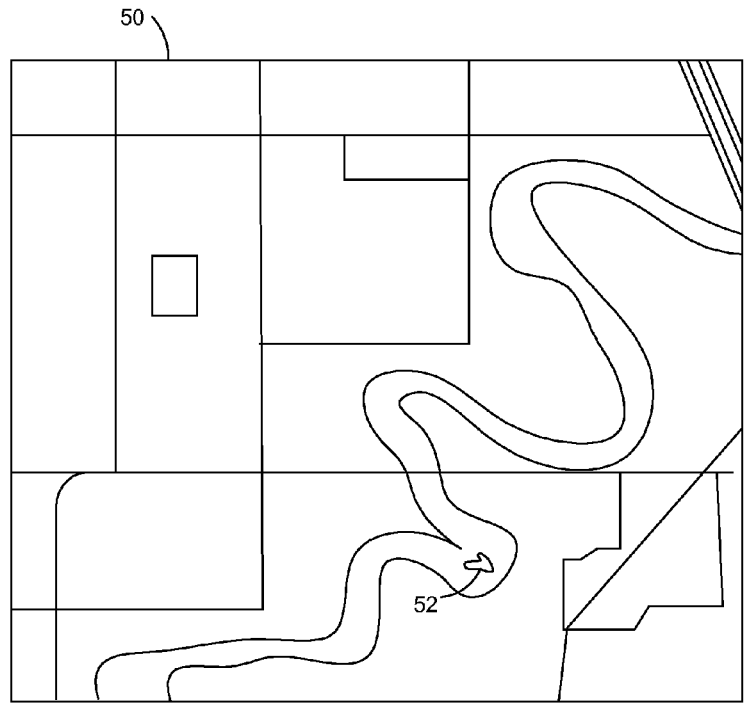
FIG. 3 shows a sample raster image of a portion of the earth's surface.
FIG. 4 is chart showing the correlation of pixel points from a sample raster image to their corresponding reference points on the earth's surface.

Referring to FIG. 2, one embodiment of a method for estimating and assigning lost coordinate system information for a geographic data file is described. The method begins at block 100 where an input raster image (i.e., a raster image corresponding to a geographic data file for which the coordinate system or projection is unknown or not identifiable) is received for processing by the software tool. The input image generally comprises a plurality of pixels that can be considered, as least logically, to be organized in an array or matrix having a plurality of rows and columns. In other words, each pixel has an x-coordinate, which identifies the particular column within which the pixel is located, and a y-coordinate, which identifies the particular row within which the pixel is located. Thus, each pixel can be identified by its unique x, y coordinates. FIG. 3 shows a sample raster image 50 representing a portion of the earth's surface. The raster image 50 includes roads, a river and other geographical features.

Next, at block 102, the input raster image is correlated to the portion of the earth's surface that the image represents. This can be accomplished by comparing selected pixel points from the input raster image to a base dataset or reference map having a known coordinate system (i.e., the "reference coordinate system"). Specifically, known reference points from the reference map are assigned to corresponding pixels of the input raster image for at least a minimum number of pixels. This will typically comprise locating known and easily identifiable reference points (e.g., landmarks such as buildings, bridges, and street intersections or recognizable land formations such as the island 52 shown in the sample image 50) from the image and then associating the appropriate pixel from the image to the corresponding reference point on the reference map. The input raster image is thus "paired" or "lined up" with the area of the reference map that the image represents. This area is referred to herein as the "reference area."

By way of example, FIG. 4 shows a chart numerically portraying the correlation of four pixel points from the sample image 50 to their corresponding reference points on the earth's surface. In this example, the four pixel points (identified as "NW," "SW," "NE," and "SE") represent the four corners of the sample image 50. For each pixel point, the chart provides the pixel location (using an x,y,z coordinate system, quantities in meters) and the corresponding reference point (using latitude and longitude, quantities in degrees). For example, the NW pixel is located at the zero x-position and zero y-position on the sample image 50 (all pixels are located at the zero z-position for the two-dimensional image) and its corresponding reference point on the earth's surface is at 43.628570000000003 latitude and −85.567300000000003 longitude.

Once the reference area has been defined, a list of possible coordinate system matches for the reference area is generated using an extensive geodetic database, as depicted at block 104. This is essentially a list of the coordinate systems that are most likely to be the coordinate system in which the geographic data file was originally formatted. The geodetic database contains descriptions of numerous global and local coordinate systems. These systems can be gathered from well-known government and private industry sources such as, but not limited to, the US Department of Commerce, NOAA, and the International Association of Oil and Gas Producers. Each coordinate system contains a mathematical description of the earth, descriptions of standard angular and linear units, and a full set of parameters used for each mathematical projection. Each coordinate system also contains unique metadata, including an envelope that identifies a proper area of use. Generally, an envelope may contain a specific area description, such as "North America," which may or may not encompass the reference area. For instance, if the reference area corresponds to an input image from Gardiner, Me. (which is located in North America), it would fall inside the "North America" envelope. In the geodetic database, envelopes contain a geographic bounding box with exact corner points for each area. In the case of a "North America" envelope, the bounding box might be 1800 West longitude, 800 North Latitude by 550 West longitude, 200 North Latitude. These envelopes in conjunction with the reference area of the input raster image will define which coordinate systems from the geodetic database will make up the list of possible coordinate system matches. That is, if the reference area falls within the envelope of a coordinate system, then that coordinate system is added to the list of possible coordinate system matches.

Next, at block 106, a statistical analysis is performed for each possible coordinate system match from the list generated at block 104. The analysis can comprise generating a polynomial equation that relates the reference coordinate system to each possible coordinate system match and using the equations to characterize the reference area of the raster image for each possible coordinate system match. The basic equations are created using a least-squares adjustment. Methods for creating the mapping between systems are well known and publicly available. Specific metrics are generated from the characterization of the reference area. These metrics include image skew and rotation in the x and y dimension, as well as separate pixel resolutions in the North and East direction, and the diagonals of the image extents. The metrics are calculated with and without a datum shift; that is, a shift between various different earth reference models (horizontal datums.) On raster images that cover a large geographic area, characterizing the shift between horizontal datums becomes more valuable.

The reference points from the input raster image are converted to each possible coordinate system using standard mathematical projection algorithms. Using some or all of the specific metrics discussed above, a key metric for each candidate coordinate system is generated based on the relative position of each reference point in each coordinate system. Weight is given for skew in each coordinate axis and distance between each point on the grid and on the surface of the earth. One possible formula for generating the key metric for determining the best fit of the coordinate system would be: (((skew in the x)+(skew in the y))*2+(skew in the xy))*((change in pixel resolution y)+(change in pixel resolution x)). In this specific example, the lowest skew value, in combination with the lowest resolution loss creates the best match candidate. This system is generally more appropriate for small area coordinate systems. Applying a greater weight to resolution changes between coordinate systems will improve matching for larger scale raster datasets. Using this key metric, the most likely coordinate systems are ranked, at block 108. The user is then presented (e.g., by displaying on the display 24) with a list of candidate coordinate systems that most closely represent the image based on the reference points provided by the user, at block 110. Generally, the coordinate system having the lowest ranking is selected as the best fit.

While specific embodiments of the present invention have been described, it should be noted that various modifications thereto could be made without departing from the spirit and scope of the invention as defined in the appended claims.

What is claimed is:

1. A method of assigning coordinate system information to a geographic data file for which coordinate system information is unavailable, the geographic data file representing a portion of the earth's surface, said method comprising:
    obtaining a raster image comprising a view of the represented portion of the earth's surface corresponding to said geographic data file, wherein said raster image does not contain coordinate system information, and wherein said raster image comprises a plurality of pixels;
    correlating said raster image to the earth's surface by assigning known reference points from a reference map of the represented portion of the earth's surface having a known coordinate system to a plurality of corresponding pixels of said raster image by comparing selected pixels from the raster image to the reference map to create a reference area;
    generating a list of possible coordinate systems for said raster image using a database containing numerous coordinate systems, wherein each possible coordinate system comprises an area of use corresponding to the represented portion of the earth's surface;
    ranking the list of possible coordinate systems as a function of a characterization of the reference area with a respective possible coordinate system; and
    assigning the coordinate system information of one of the possible coordinate systems to the geographic data file as a function of the ranking.

2. The method of claim 1 further comprising displaying the possible coordinate systems based on said rankings.

3. The method of claim 1, wherein ranking the list of possible coordinate systems comprises:
    performing a statistical analysis for each possible coordinate system; and
    using said statistical analysis to rank said possible coordinate systems.

4. The method of claim 3 wherein performing a statistical analysis includes calculating specific metrics for said raster image and generating a key metric using said specific metrics.

5. The method of claim 4 wherein said specific metrics are selected from the group consisting of image skew and rotation, pixel resolutions, and diagonals of the image extents.

6. The method of claim 5 wherein said specific metrics are calculated with and without a datum shift.

7. The method of claim 4 further comprising using said key metric to rank said possible coordinate systems.

8. The method of claim 1, wherein:
    the known reference points from the reference map are selected from the group comprising: landmarks, buildings, bridges, street intersections, and recognizable land formations.

9. A non-transitory computer-readable medium containing instructions for controlling a computer system to perform a method of assigning coordinate system information to a geographic data file for which coordinate system information is unavailable, the geographic data file representing a portion of the earth's surface, wherein said method comprises:
    obtaining a raster image comprising a view of the represented portion of the earth's surface corresponding to said geographic data file, wherein said raster image does not contain coordinate system information, and wherein said raster image comprises a plurality of pixels;
    correlating said raster image to the earth's surface by assigning known reference points from a reference map of the represented portion of the earth's surface having a known coordinate system to a plurality of corresponding pixels of said raster image by comparing selected pixels from the raster image to the reference map to create a reference area; and
    generating a list of possible coordinate systems for said raster image using a database containing numerous coordinate systems, wherein each possible coordinate system comprises an area of use corresponding to the represented portion of the earth's surface;
    ranking the list of possible coordinate systems as a function of a characterization of the reference area with a respective possible coordinate system; and
    assigning the coordinate system information of one of the possible coordinate systems to the geographic data file as a function of the ranking.

10. The computer-readable medium of claim 9 wherein said method further comprises displaying the possible coordinate systems based on said rankings.

11. The non-transitory computer-readable medium of claim 9 wherein ranking the list of possible coordinate systems comprises:
    performing a statistical analysis for each possible coordinate system; and
    using said statistical analysis to rank said possible coordinate systems.

12. The non-transitory computer-readable medium of claim 11 wherein performing a statistical analysis includes calculating specific metrics for said raster image and generating a key metric using said specific metrics.

13. The non-transitory computer-readable medium of claim 12 wherein said specific metrics are selected from the group consisting of image skew and rotation, pixel resolutions, and diagonals of the image extents.

14. The non-transitory computer-readable medium of claim 13 wherein said specific metrics are calculated with and without a datum shift.

15. The non-transitory computer-readable medium of claim 12 wherein said method further comprises using said key metric to rank said possible coordinate systems.

16. The non-transitory computer-readable medium of claim 9 wherein:
    the known reference points from the reference map are selected from the group comprising: landmarks, buildings, bridges, street intersections, and recognizable land formations.

* * * * *